United States Patent [19]
Kendall

[11] Patent Number: 5,827,620
[45] Date of Patent: Oct. 27, 1998

[54] SOLID OXIDE FUEL CELL STRUCTURES

[75] Inventor: Kevin Kendall, Runcorn, Great Britain

[73] Assignee: Keele University, Staffordshire, Great Britain

[21] Appl. No.: 525,598
[22] PCT Filed: Mar. 17, 1994
[86] PCT No.: PCT/GB94/00549
  § 371 Date: Nov. 24, 1995
  § 102(e) Date: Nov. 24, 1995
[87] PCT Pub. No.: WO94/22178
  PCT Pub. Date: Sep. 29, 1994

[30]  Foreign Application Priority Data

Mar. 20, 1993 [GB] United Kingdom .................. 9305804
Mar. 20, 1993 [GB] United Kingdom .................. 9305823

[51] Int. Cl.⁶ ............................................. H01M 8/12
[52] U.S. Cl. ............................................. 429/31; 429/32
[58] Field of Search ........................................ 429/31, 32

[56]  References Cited

U.S. PATENT DOCUMENTS

| 3,377,203 | 4/1968 | Möbius et al. . |
| 4,644,751 | 2/1987 | Hsu ................................. 60/676 |
| 4,894,297 | 1/1990 | Singh et al. ....................... 429/31 |
| 4,910,100 | 3/1990 | Nakanishi et al. ................. 429/32 |
| 5,034,288 | 7/1991 | Bossel ............................... 429/32 |

FOREIGN PATENT DOCUMENTS

| 70448 | 1/1983 | European Pat. Off. . |
| 94731 | 11/1983 | European Pat. Off. . |
| 482783 | 4/1992 | European Pat. Off. . |
| 2067181 | 8/1971 | France . |
| 63-128559 | 6/1988 | Japan . |
| 4-62760 | 2/1992 | Japan . |
| 1216024 | 12/1970 | United Kingdom . |

OTHER PUBLICATIONS

Patent Abstracts of Japan, vol. 016–267, Jun. 1992, (E 1217) for Kokai No. 4–62760 (Feb. 1992).
Chemical Abstracts, vol. 117, No. 73159C.
Derwent Abstract No. 91–277684, for Japanese Kokai No. 3–183658 (Aug. 1991).

Primary Examiner—Stephen Kalafut
Attorney, Agent, or Firm—Clifford W. Browning; Woodard, Emhardt, Naughton, Moriarty & McNett

[57]  ABSTRACT

Solid oxide fuel cell structures which are capable of relatively rapid temperature changes without cracking and which are simple to seal. In one arrangement, a tubular SOFC structure comprises a self-supporting extruded tube of zirconium oxide with inner and outer electrodes. The tube may have an outside diameter of from, for example, 1 to 5 mm and a wall thickness of from, for example, 50 to 200 microns. In an alternative arrangement, a simple gas type planar interconnect for a planar SOFC is provided in the form of a sheet of ceramic material having electrically conducting bodies of ceramic material embedded in it so as to provide an electrical path through the sheet. To avoid edge sealing problems, fuel gas and air may be delivered to a stacked SOFC structure through tubes extending between adjacent cell sub-assemblies such that the gas is delivered to a central portion of each anode of the cell stack and flows outwards towards the edges of the stack.

26 Claims, 5 Drawing Sheets

SOLID OXIDE FUEL CELL STRUCTURES

This is a National Stage Application of PCT/GB94/00549 filed Mar. 17, 1994.

The present invention relates to solid oxide fuel cell (hereinafter referred to as SOFC) structures.

BACKGROUND OF THE INVENTION

SOFCs of three basic designs are currently being developed. These three basic designs are generally referred to by the term tubular, planar and monolithic. All of these fuel cells are based upon a stabilised zirconia electrolyte which is capable of conducting oxygen ions at elevated temperatures. A typical operating temperature for a SOFC is 1000° C. The known cells provide high electrical efficiencies and can be operated on a variety of fuels including hydrogen, carbon monoxide, coal-derived gases and natural gas. SOFCs also offer high quality exhaust heat for co-generation applications. Of potentially the greatest significance, however, is the fact that SOFCs produce very low emissions as compared with, for example, diesel generators and therefore can be located wherever an electrical generator is required. For example, it would be possible to replace a relatively dirty and noisy diesel generator providing power to a hospital by a SOFC.

The paper "Solid Oxide Fuel Cells—The Next Stage", author Brian Riley, pages 223–238 of "Journal of Power Sources", 29(1990) briefly describes the various known SOFC structures and reference should be made to that document for details of the structure of the known planar, monolithic and tubular geometries. It will be appreciated, however, that all of the known structures incorporate a solid electrolyte one side of which supports an anode to which fuel gas is delivered and the other side of which supports a cathode to which air or oxygen is delivered. When an external load is connected to the anode and cathode, oxygen at the cathode reacts with incoming electrons from the external circuit to form oxygen ions which migrate to the anode through the oxygen-ion conducting electrolyte. At the anode, the fuel is oxidised with these oxygen ions, resulting in the liberation of electrons to the external circuit. Thus the overall reaction is simply the oxidisation of fuel. Typically 50 to 90% of the fuel is utilised in the electrochemical cell reaction, the partially depleated fuel being combusted outside the cell. The exhaust gas from the cell can be used in a co-generation system for producing process steam or in a steam turbine for an all-electric system. As each cell has a theoretical open voltage of about 1 volt, it is necessary to interconnect a number of cells to provide an appropriate output voltage.

If SOFCs are to be widely useable, they must be very reliable over long term use. The known cells are prone to two problems which compromise long term reliability, the first problem being the fact that fuel cell structures are very easily damaged if subjected to thermal shocks, and the second problem being related to the difficulty experienced in sealing the fuel cell structures so that fuel and oxygen are reliably delivered to opposite sides of a relatively thin electrolyte and do not come into contact with each other until the fuel has been at least significantly depleated. It has proved difficult to deal with these problems given the high operating temperatures and the fact that it is fundamental to the operation of fuel cells that thin ceramic structures form the interface between the anode and cathode. Such structures crack easily when exposed to varying temperatures. The conventional approach to reducing the significance of these problems is to very slowly heat up the fuel cell structure to the normal operating temperature of 1000° C. and to maintain that temperature continuously. Unfortunately in the real world continuous operation of a system cannot be guaranteed. Until such time as manufacturers can assure potential users that, for example, a power failure resulting in rapid cooling of a SOFC would not cause any structural damage to such a cell it is going to be very difficult to convince potential customers that SOFCs are a viable alternative to conventional electrical generation systems.

In the case of conventional tubular electrode structures, the basic cell is in the form of a porous support tube onto which a cathode or air electrode is deposited as a layer by slurry-dipping. The electrolyte is then deposited on the cathode by electrochemical vapour deposition or plasma spraying. The anode or fuel electrode is then formed on the electrolyte by slurry dipping. Electrical connections are made to the anode by a simple nickel felt pad applied to its outer surface. Electrical connections are made to the cathode by forming an elongate strip of electrical conductor along the length of the tube, the electrolyte not covering the electrical conductor. Tubes can thus be interconnected by appropriately positioning them with the cathode and anode interconnects of adjacent tubes in contact. The exterior surface of the tube is exposed to fuel gas, and air is pumped into the interior through an air tube extending along most of the length of the tube from one end of the tube. The other end of the tube is closed so that injected air flows back through the annular space defined between the air tube and the support tube.

The known tubular arrangement is effective but cannot be heated or cooled rapidly without cracking. The incorporation of the axially extending air tube simplifies the problem of sealing, as a seal can be made relatively easily to the relatively cool air tube, and in addition enables some preheating of the air delivered to the interior of the support tube, thereby reducing thermal shocks. Unfortunately, providing the air tube increases costs substantially both because of increased material costs and because the structure is relatively difficult to manufacture. Furthermore, the deposition of the electrolyte and interconnect on the cathode is a very costly process step.

The manufacturers of the known tubular structures have recognised that the incorporation of the support tube accounts for some 70% of the total weight of the cell which results in a relatively low energy density for the design. With a view to reducing the overall weight, it has been proposed to replace the calcia-stabilised support tube by a self-supporting cathode to improve the energy density. This approach may improve the energy density but does not address the problems of cracking or cost outlined above.

In the case of planar and monolithic SOFCs, which comprise a stack of plate-like sub-assemblies, it is conventional practice to feed air into the structure from a manifold located on one side of the stack and to feed fuel gas into the structure from a manifold located on an adjacent side of the stack. The fuel and air are pumped in mutually perpendicular directions from one side of the stack towards the other. Seals must be provided around the edges of the manifolds, around the edges of the anodes which face and must be isolated from the air manifold, and around the edges of the cathodes which face and must be isolated from the fuel manifold. The formation of these seals is difficult to achieve reliably, and the seals are prone to cracking. for example, in the event of the fuel cell structure being allowed to cool.

In the case of planar SOFC stacks, a further problem is encountered in providing the interconnection between adjacent cells. One approach which has been used is to form a metal plate into a corrugated sheet. Such plate tends to oxidise, however, and thus form insulating corroded layers, or they expand in a different manner from the adjacent cell plates causing stresses and possible cell fracture. As an alternative to the metal interconnects, proposals have been made to fabricate interconnects from lanthanum chromite, but these have provide too bulky and difficult to fabricate economically. Attempts have been made to use vapour deposited lanthanum chromite as the interconnect but again this has proved very expensive to manufacture.

SUMMARY OF THE INVENTION

It is an object of the present invention to obviate or mitigate the problems outlined above.

According to the present invention there is provided a tubular SOFC structure, comprising a self-supporting extruded tube at least a longitudinally extending portion of which is formed from an electrolyte, an electrically conductive inner electrode making electrical contact with the inner wall of the electrolyte, and an electrically conductive outer electrode making electrical contact with the outer wall of the electrolyte.

By relying upon the electrolyte structure itself to be self-supporting the tube may be made with a sufficiently small diameter and small wall thickness to make it highly resistant to cracking. For example a tube of this structure can be heated at any point along its length with a very localised flame to the normal operating temperatures of an SOFC (typically 1000° C.) without incurring any damage. Thus an SOFC based on such tubular components can be rapidly heated and cooled without damage, dramatically improving the reliability of such systems and making them useable in many more applications, for example as emergency power supplies.

The tube may be made from stabilised zirconia and readily extruded after being mixed with, for example, polyvinyl butyral and cyclohexanone. The manufacturing process is thus essentially very simple. Thus the cost of the tubes is very much lower than with the known tubular structures.

The inner electrode may extend the length of the extruded tube, although each tube could be in effect split into a series of separate cell structures providing appropriate connections through the tube wall could be made. The inner electrode can be in the form of a spiral wire in contact with a porous layer of conductive ink deposited inside the tube. The outer electrode may comprise a porous layer of for example doped lanthanum manganite engaged by a spiral wire.

Alternatively the inner electrode could be extruded as part of the self-supporting tube and may be formed, for example, from a mixture of nickel and zirconium oxide. The self-supporting tube may be made from electrolyte and a longitudinally extending strip of electrically conductive material that extends radially through the tube wall and makes contact with the inner electrode. This facilitates interconnection of a series of the tubes.

The tubular structures may be incorporated in a fuel cell system in which a thermally insulating enclosure is provided into which the tubular structures extend and to which fuel gas is supplied. The ends of the tubular structures within the enclosure are open to enable residual fuel gas to enter the enclosure. At least one air inlet is provided through which air is supplied to the interior of the enclosure, residual air combusting with the residual fuel gas and the resultant combustion products passing to an exhaust outlet. The air inlet may pass into the enclosure through the exhaust outlet to preheat incoming air. Air may be mixed with the fuel gas before it is delivered to the tubular structure to prevent the formation of carbon deposits within the reactor tubes.

In accordance with a second aspect of the present invention, there is provided a gas tight planar interconnect for a planar SOFC, comprising a sheet of ceramic material, and a plurality of electrically conducting bodies of ceramic material extending through the sheet to provide conductive paths through the sheet.

The ceramic sheet and the electrically conductive bodies embedded in that sheet may be readily fabricated and may have very similar coefficients of expansion such that the interconnect is not readily cracked as a result of changing temperatures. The bodies of electrically conducting ceramic material may project from both surfaces of the sheet so as to provide a spacing around the projecting portions through which fuel gas or air may be delivered to an adjacent SOFC. The sheet may be a composite structure formed on one side from a material which is resistant to air and on the other side from a material which is resistant to fuel gas.

According to a third aspect of the present invention, there is provided a stacked SOFC structure, comprising a series of sub-assemblies each including a plate of electrolyte sandwiched between an anode and a cathode, the anode of one sub-assembly being electrically connected to the cathode of an adjacent sub-assembly in the stack, and passageways being defined between adjacent sub-assemblies in the stack through which fuel gas and air are delivered to the anode and cathode, wherein fuel gas supply conduits extend between adjacent sub-assemblies to deliver fuel gas to central regions of each anode such that the delivered gas flows outwards from the central regions of the anodes towards the edges of the stack.

By arranging for fuel gas to be delivered to the centre of each anode, and for the fuel gas to flow outwards towards the edges of the stack such that only residual fuel gases reach the edge of the stack, the severe problems of edge sealing in stacked SOFCs which have been experienced in the past are simply avoided.

Preferably air or oxygen is delivered to central regions of the cathodes such that the air flows outwards towards the stack edges. Residual fuel gas and oxygen-depleated air reaching the edges of the stack may be burned to maintain the stack temperature. The fuel gas and air may be delivered to the stack through ceramic tubes of extruded zirconia oxide of the type described above.

BRIEF DESCRIPTION OF THE DRAWINGS

Embodiments of the present invention will not be described, by way of example, with reference to the accompanying drawings, in which.

DETAILED DESCRIPTION OF THE PREFERRED EMBODIMENTS

Figures 1, 2:
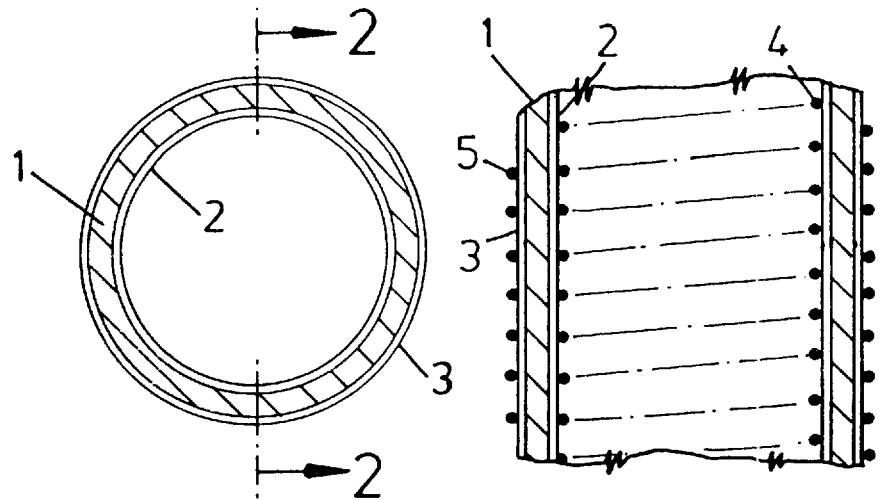
FIG. 1 is a section through a tubular SOFC structure in accordance with the present invention.
FIG. 2 is a section through the structure of FIG. 1 after the structure of FIG. 1 has had internal and external spiral wires attached to it.

Referring to FIGS. 1 and 2, the illustrated arrangement comprises an extruded electrolyte tube 1 supporting an inner electrode 2 in the form of a nickel/zirconia cermet ink defining an anode. A strontium doped lanthanum manganite layer 3 is formed on the outside of the tube to define a cathode or air electrode. As shown in FIG. 2, electrical contact is made with the internal electrode 2 by winding a spiral wire 4 inside the tube. Electrical contact to the outer electrode 3 is similarly achieved by winding a spiral wire 5 onto the layer 3. If such a tube is placed in an oxygen-containing enclosure maintained at about 1000° C. and fuel gas is supplied to the interior of the tube a solid oxide fuel cell (SOFC) is formed and as a result current will flow to any external circuit connected to wires 4 and 5.

Tubes of the type described have been found to be easy to manufacture, to resist cracking even if heated or cooled rapidly, and to be easy to seal. The tubes can be readily extruded using a mix of, for example, zirconia powder and polymer formulation. After firing to full density, these tubes can be heated to 1000° C. rapidly and cooled equally rapidly without damage. Furthermore, the tubes can be passed through an insulating layer defining the wall of a chamber, the interior of which is maintained at 1000° C. even though one end of the tube is at room temperature and the other end is at the temperature of the enclosure. Cold gas can then be passed down the tube without causing it to crack. Sealing the tube on the cold end is simple, for example using simple plastics connections. Thus the problems associated with known tubular SOFC structures are overcome.

The thin walled zirconia tube may be made from stabilised zirconia, for example using yttria stabiliser. Between 3 and 12 mol % may be used although preferably from 6 to 10 mol % is used and the preferred amount of stabiliser is 8 mol %. It will be appreciated that stabilisers other than yttria may be used, for example magnesia, calcia, ceria, alumina and others known in the art. The outside diameter of the tube may be from 1 to 5 mm, although other sizes are possible. The tube need not necessarily be round, as fluted or "wavy" cross sections can prove to be advantageous and are readily extrudable. The zirconia wall thickness is preferably between 50 and 200 microns ($10^{-6}$ meters) to allow for the ready passage of oxygen ions during fuel cell operation. If the zirconia is extruded with the anode, the zirconia could be relatively thin, for example from 5 to 10 microns. The inner and outer electrodes may be deposited in the form of inks containing active powders. The inks are sintered and then electrical connections are made to them to enable current to be drawn from the cell. Metal or ceramic components may be used to make the electrical connections, for example the illustrated wires shown in FIG. 2. Each tube may form a single cell, although several cells could be positioned on each tube. In such a case, interconnects would have to be positioned along the length of the tube. Alternatively, a line of interconnect can be formed in the wall of the tube and this can be achieved by extrusion in a single shot process.

Many tubes must be interconnected to make an SOFC assembly of reasonable output power. The necessary interconnections may be achieved in a number of ways. For example, each tube may be a single cell which is connected externally to neighboring cells, or each tube may form multiple cells with internal interconnections along the length of the tube, each tube then being connected externally to other tubes. As a further alternative each tube may be single cell which is connected internally to surrounding tubes by means of interconnect strips extending along the lengths of the tubes. Tubes may be connected in series or parallel or in combinations of series and parallel connections. The tubes will normally be straight and parallel, but could also be curved or shaped so as to channel gas in desirable directions. Fuel gas may be delivered either to the inside or the outside of the tubes and residual fuel gas may be recycled to the fuel gas inlet.

A tube of the type illustrated in FIGS. 1 and 2 was fabricated using 8 mol % yttria stabiliser zirconia powder which was mixed with polyvinyl butyral and cyclohexanone in proportions by weight of 100/8/9. The composition was mixed intensively in a Dow mixer to break down any agglomerates. The plastics mix was pressed into a sheet under 5 MPa pressure and then extruded in a tube die to give a 5 mm diameter tube of 0.2 mm wall thickness. After drying, the tube was supported inside an alumina tube of slightly larger diameter and fired in a furnace. The polymer binder was first removed at 1° C. per minute until a temperature of 500° C. was achieved, and then the tube was sintered to 1500° C. at 5° C. per minute and held at that temperature for one hour. Nickel/zirconia cermet ink was coated on the inside of the tube to form the anode and strontium doped lanthanum manganite was coated on the outside to form the air electrode. These electrodes were fired at 1200° C. with platinum wires attached as current leads.

Figure 3:
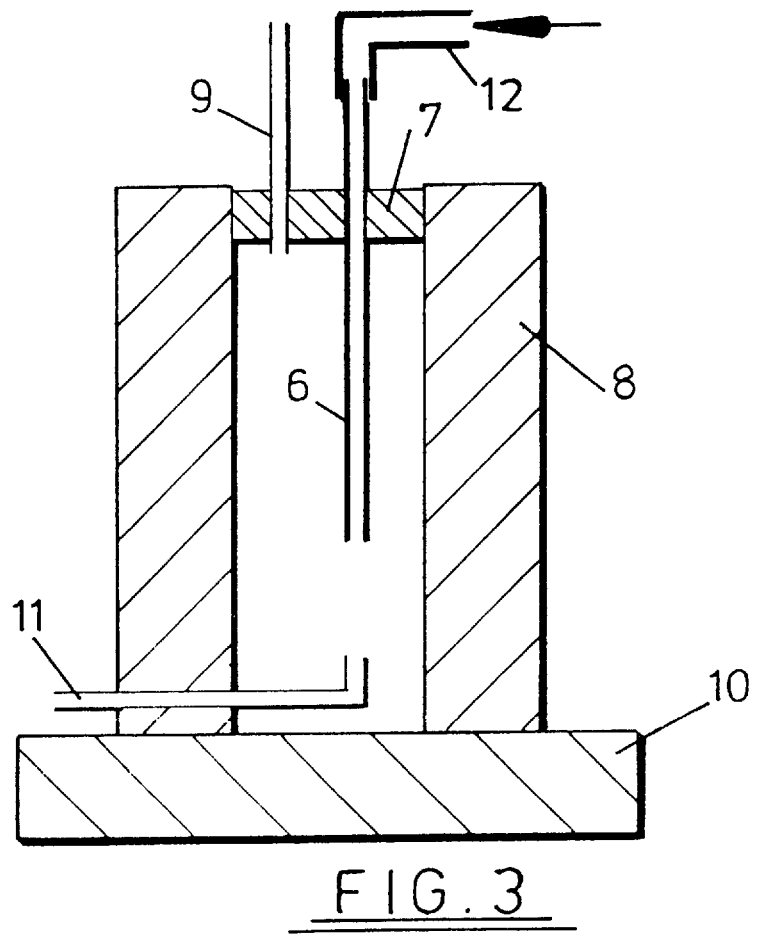
FIG. 3 is a schematic illustration of an SOFC system of rudimentary form which has been used to prove the utility of the tubular structure illustrated in FIGS. 1 and 2.

The resultant tube was then placed in a furnace of the type schematically illustrated in FIG. 3. The tube 6 was passed through a bore drilled in a thermally insulating plug 7 inserted in the top of a tubular body 8 of insulating material. An exhaust outlet tube 9 was also positioned in the plug 7. The tubular body 8 was supported on a base 10. An air inlet tube 11 extended into the lower portion of the enclosure defined within the insulating body.

A rubber tube 12 was connected to the upper end of the SOFC tubular structure 6. Fuel gas was then passed through the tube 12 and the tube 6 into the enclosure and burnt with air delivered through tube 11. When the temperature within the enclosure had reached 1000° C. the tube was seen to act as an SOFC. Turning off the supply of fuel gas resulted in a rapid fall in temperature within the enclosure but this did not damage the tube 6, nor did the tube suffer any damage as a result of the large temperature differentials between its two ends.

Figure 4:
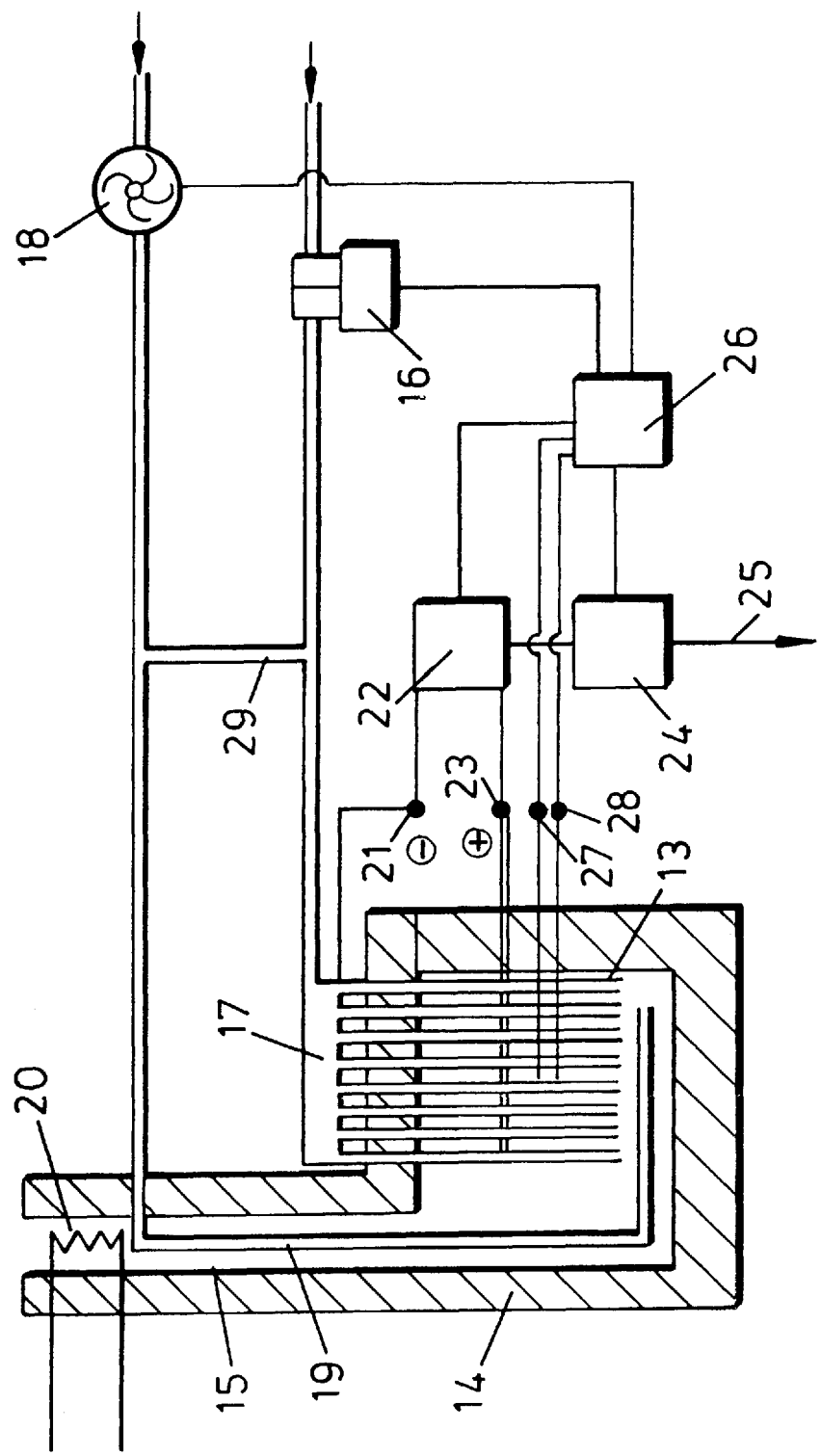
FIG. 4 illustrates to a fuel cell system which may be fabricated using a plurality of the tubular structures illustrated in FIGS. 1 and 2.

FIG. 4 illustrates a proposed system incorporating tubes of the type illustrated in FIGS. 1 to 3 in an assembly capable of providing reasonable power output levels. An array of tubes 13 is supported within a thermally insulating container 14 from which combustion products can escape through exhaust passageway 15. Fuel gas is supplied to the container 14 through a valve 16, a manifold 17 and the tubes 13, the bottom ends of which simply open into the interior of the container. Air is supplied to the container from a blower fan 18 via an inlet pipe 19 that extends through the exhaust outlet 15. The air is pre-heated as it passes through the tube 19. A water heat exchanger 20 is also provided in the exhaust outlet 15 to extract heat energy from the exhaust gas stream.

The internal electrodes (not visible in FIG. 4) within the tubes 13 are connected to a negative terminal 21 of a battery 22 whereas the outer electrodes of the tubes 13 are connected to the positive terminal 23 of the battery 22. The output of the battery is converted from DC to AC by a converter 24 to deliver the required AC output as represented by arrow 25. The system is controlled by a controller 26 that monitors the condition of the battery, the temperature within the container 14 as indicated by a thermocouple connected to terminal 27, and the operation of the DC to AC converter 24. In addition the controller 26 energises the valve 16 and an igniter positioned within the container 14 and connected to terminal 28.

The illustrated system was designed to provide both electric power and heat in the 0.2 to 20 KWh scale. The system is well integrated to give the smallest number of parts, and those parts are designed to enable the system to be switched on and off as required without damage. Such a system is ideally suited to replace conventional power generators such as diesel or turbine engines.

The tubes 13 are fed with fuel from the manifold 17. The rate of supply of gas is controlled by the vale 16 in response to control signals generated by the controller 26. The controller also controls the blower 18, the speed of which is modulated in response to variations in the temperature within the container 14 as monitored by the thermocouple. As the air and fuel are brought together inside the container, the gas is ignited by the igniter. Gas flows could be typically in the range of 10 to 1000 ml/s, while air flows are typically in the range of 100 to 10,000 ml/s.

The output of the blower 18 is connected by an air bleed line 29 to the gas supply line. Mixing air with the supplied fuel gas prevents the formation of carbon within the tubes 13. This is important as given that the tubes have small internal diameters they could easily be blocked by carbon deposits. The rate of supply of air through the bleed line 29 will typically be the same as the rate of supply of fuel gas.

The detailed geometry of the assembly of tubes 13 may vary depending on the size and purpose of the device. For example, a small device may contain 20 sub-units each containing 30 short tubes 13. A larger device may contain 40 sub-units each containing 100 long tubes. The overall layout of the system will, however, remain the same in both cases.

it will be appreciated that in larger installations several air feed tubes may be appropriate, and that the water heater may be omitted in certain applications, for example where there is a need for hot gas to drive a heater or chiller.

In the arrangement of FIG. 4, partially depleated fuel gas is simply burnt within the container 14, the combustion products leaving the container through the exhaust 15. It would be possible, however, to re-cycle partially depleated fuel, for example simply by passing the tubes 13 through the bottom wall of the container 14 and recycling the gas within them to the manifold 17. This approach would enable steam reforming to take place, again with a view to preventing carbon build up in the system. Of course, no problems will arise with carbon if the fuel gas is, for example, hydrogen or methanol.

Figure 5:
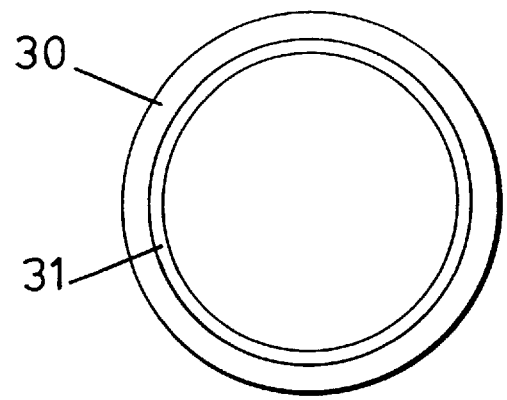
FIG. 5 illustrates the structure of a further embodiment of the invention with a co-extruded internal electrode.

As briefly mentioned above, alternatives are available to the tubular structure illustrated in FIGS. 1 and 2. In particular, advantages will arise from reducing the number of process steps and the number of components required to make any particular tube. As illustrated in FIG. 5, the process steps necessary to form the inner electrode shown in FIGS. 1 and 2 can be avoided by the simple expedient of co-extruding the zirconia electrode 30 with an anode 31. The anode could be formed from zirconia and nickel and would enable current to be carried along the length of the tube. Such an arrangement would avoid the need for depositing an ink inside the ceramic tube as shown in FIG. 2 and for providing a contact wire within the tube.

Figure 6:
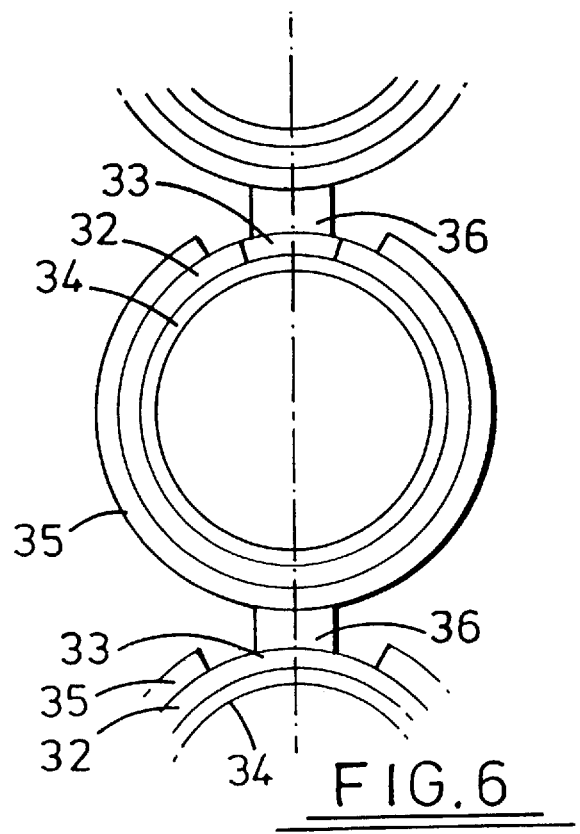
FIG. 6 illustrates an alternative arrangement to that of FIG. 5 with a co-extruded electrical interconnect provided in the wall of the tube to enable the interconnection of a series of tubular structures.

With the arrangements of FIGS. 1 and 5 current is taken from the internal electrode to one end of the tube. Alternative arrangements are, however, possible and one such arrangement is illustrated in FIG. 6. In this arrangement three components are extruded in a single step, that is a zirconia oxide electrolyte 32, an electrically conducting interconnect 33, and an internal electrode 34. An outer nickel-containing electrode 35 is then formed on the tube in a position so that it does not contact the interconnect 33. Adjacent tubes of an identical structure can then be interconnected in series as shown in FIG. 6 by sandwiching a nickel felt pad 36 between adjacent tubes.

Figure 7:
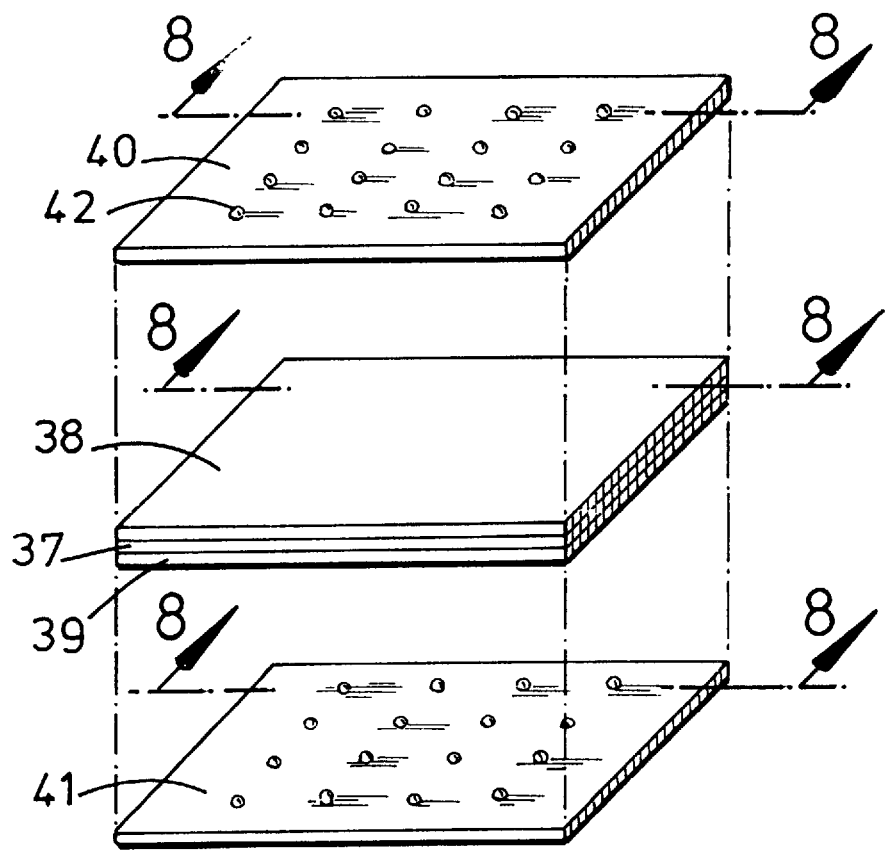
FIG. 7 is an exploded view of two gas-tight planar interconnects in accordance with the present invention and an SOFC planar structure which in use is sandwiched between the interconnects.
Figure 8:
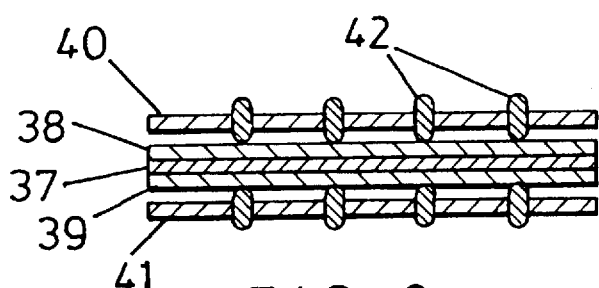
FIG. 8 is a section through the components of FIG. 7 assuming that they have been brought together into their normal potential relationship.
Figure 9:
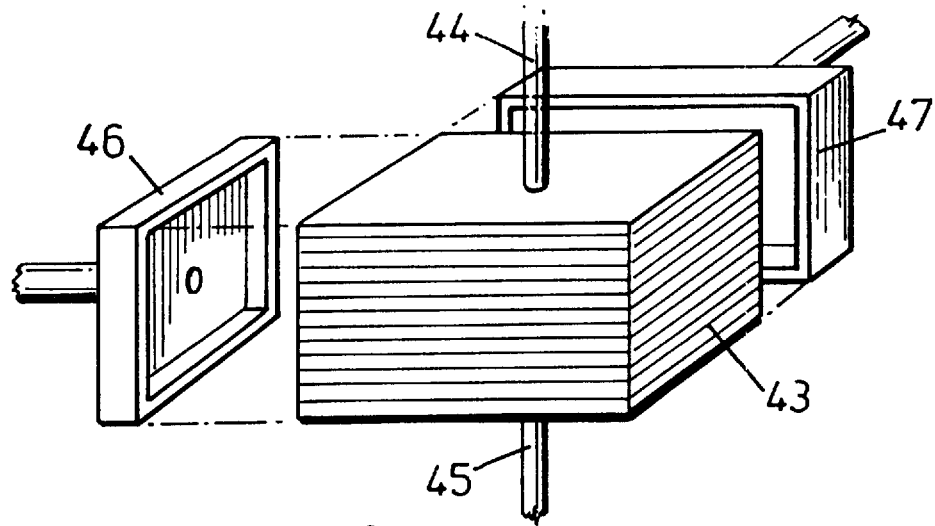
FIG. 9 is a schematic illustration of a stacked SOFC structure which can be built up using components such as those illustrated in FIGS. 7 and 8.

Referring now to FIGS. 7 to 9, a gas type planar interconnect for a planar SOFC will be described. A planar SOFC comprises a series of sub-assemblies each including a plate of electrolyte 37 (for example zirconia dioxide) sandwiched between a pair of electrodes 38 and 39 which respectively define the anode and cathode of the sub-assembly. Fuel gas is supplied to the anode 38 and air or oxygen is supplied to the cathode 39. Interconnect plates 40 and 41 are disposed above and below the electrolyte and electrode structure to convey current vertically through the stack. Clearly it is necessary to provide passages between the plates 38 and 40 and between the plates 39 and 41 to enable the supply of air and fuel gas. Typically this is achieved in prior art planar SOFC devices by forming bipolar interconnect plates which define grooves on each of their surfaces, one set of grooves delivering air to an electrode beneath the plate and the other set of grooves delivering fuel gas to an electrode above the plate. The manufacture of such bi-polar plates is a relatively expensive process.

The interconnect plates 40 and 41 as shown in FIGS. 7 and 8 can be substituted for the known bi-polar plates. The interconnect plates 40 and 41 comprise an insulating ceramic sheet incorporating electrically conducting ceramic bodies 42. The result is a thin sheet of insulating material which is also gas tight, mechanically strong and matched in its thermal expansion characteristics to the ceramic components of the remaining parts of the SOFC. The basic sheet is preferably formed from partially stabilised zirconia, or some other strong ceramic material. This support sheet is typically from 0.1 to 0.5 mm in thickness. The conducting elements 42 are spaced apart in a regular array across the support plate, the conducting elements typically being 0.5 to 5 mm across and spaced apart at from 5 to 20 mm intervals. In the illustrated example, as shown in FIG. 8, the conducting elements project from both of the surfaces of the support plate so as to provide a spacing between the support sheet of interconnect 40 and the electrode 38 and between the support sheet of interconnect 41 and electrode 39. This spacing enables gas to flow to the electrodes. The electrically conducting elements thus not only provide the required spacings but also provide a route for current to flow between adjacent sub-assemblies in the stack.

The interconnect plate must resist both air and fuel, and with this in mind may be made from lanthanum chromite. The conducting elements will ideally have the same coefficient of expansion as the support plate. The support plate may itself be a composite structure, formed from an air resistant material on one side and a fuel resistant material on the other.

Although the conducting elements in the illustrated case are arranged to project from the two surfaces of the support plates so as to provide a spacing between the support plate and the adjacent SOFC structure, in some circumstances an interconnect may be required where there is no need to provide such a spacing. In those circumstances it would be appropriate for the conducting elements to be of the same thickness as the support plate.

The interconnect plate need not be flat, but could be convoluted as required. The edges of the plate could be shaped to guide gas flows or to provide for sealing.

In one example, a gas tight planar interconnect in accordance with the invention was formed by mixing 3 mol % yttria stabilised zirconia powder with polyvinyl butyral and cyclohexanone in proportions by weight of 100/8/9. The composition was mixed intensively to break down the agglomerates. The sheet was then pressed and rolled into a sheet 0.3 mm thick, and 1 mm diameter holes spaced 10 mm apart were cut into the sheet with a punch. Pressed spheres of lanthanum chromite powder were inserted in the holes and sealed into the zirconia sheet by pressure. The sheet was then dried out and the composite was fired at 1550° C. to sinter for one hour. The two materials were matched for sintering shrinkage, and accordingly the plate did not crack, but performed as a conducting connector between two cells made from cubic zirconia coated with nickel cermet and lanthanum manganite electrodes.

Sub-assemblies as exemplified by components 37, 38 and 39 in FIG. 7 would in an SOFC stack alternate in the stack with interconnect plates such as plate 40 or plate 41 of FIG. 7. The final assembly might be as illustrated in FIG. 9, that is a cuboid stack 43 having electrical conductors 44 and 45 connected to its upper and lower levels. An air manifold 46 would be connected to one side face of the stack, the air manifold being in communication with one side only of each of the electrode sub-assemblies. A similar fuel gas manifold 47 would be connected to an adjacent side face of the stack, the manifold 47 being in communication with only the cathode sides of the electrode sub-assemblies. The other two sides of the stack would not be sealed so as to enable oxygen-depleated air pumped in through the manifold 46 and depleated fuel pumped in through the manifold 47 to be removed from the stack. Such an arrangement is a practical possibility but sealing the edges of the stack is difficult to achieve in a reliable manner. Accordingly an alternative arrangement is illustrated in FIG. 10.

Figure 10:
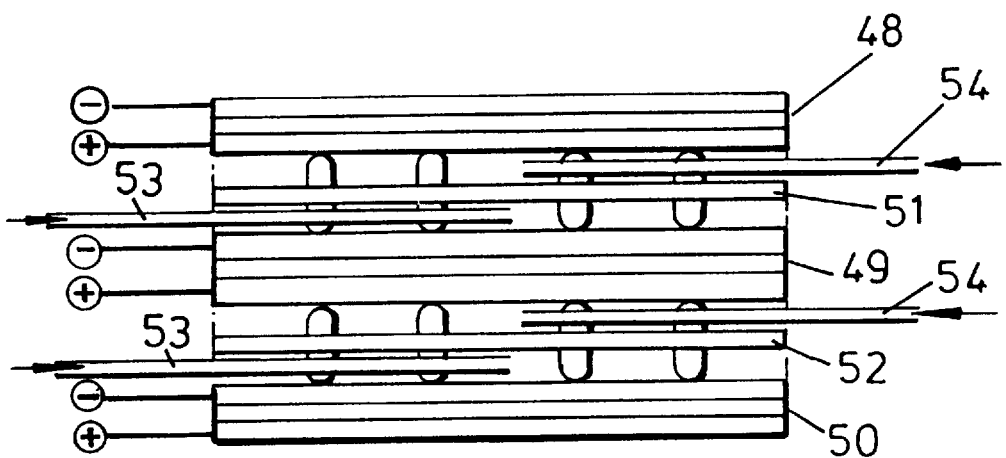
FIG. 10 illustrates a further stacked SOFC structure in which fuel gas and air are supplied to central regions of the structure to avoid problems with edge sealing of such stacks.

FIG. 10 shows three electrode sub-assemblies 48, 49 and 50 separated by planar interconnects 51 and 52. The sub-assemblies 48, 49 and 50 are identical to the sub-assembly shown in FIG. 7 and the interconnects 51 and 52 are identical to the interconnects 40 and 41 of FIG. 7. In the arrangement of FIG. 10, however, rather than relying upon the supply of air and fuel gas from edges of the stack. Fuel is injected through fuel inlet tubes 53 and air is injected through air inlets 54. It will be seen that the fuel and air inlets both terminate in central regions of the stack such that the injected air and fuel moves from its delivery point within the stack towards the edges of the stack. During its progress towards the edges of the stack the fuel cell operates to remove oxygen from the air and to depleat the fuel gas. Residual gas reaching the edge of the stack will simply burn with what is left of the oxygen in the supplied air. There are thus no sealing problems of the type confronted in structures of the type shown in FIG. 9. If the gas and air inlet tubes 53 and 54 are extruded ceramic tubes of the general type described above it is a simple matter to connect the cold ends of these pipes by, for example, rubber tubing to appropriate gas and air supplies dispite the fact that the delivery ends of the tubes are maintained at a temperature of 1000° C. Accordingly not only is it not necessary to provide high reliability seals to the edge of the stack, but it is also a simple matter to make connects to the gas and air supply tubes.

I claim:

1. A tubular SOFC structure comprising a self-supporting extruded tube a longitudinally extending portion of which includes an electrolyte, an electrically conductive inner electrode making electrical contact with the inner wall of the electrolyte, an electrically conductive outer electrode making electrical contact with the outer wall of the electrolyte, a thermally insulating enclosure defining a wall through which the tube extends such that a first portion of the tube extends within the enclosure and a second portion of the tube extends outside the enclosure, a first gas supply conduit connected to the end of the second portion of the tube by a gas-tight seal located outside the enclosure, a second gas supply conduit which opens within the enclosure, one of the first and second gases being a fuel gas and the other containing oxygen, and means for heating the interior of the enclosure to a temperature at which the structure operates as a solid oxide fuel cell, wherein the inner electrode extends the length of the extruded tube, and wherein the inner electrode is a spiral wire in contact with a porous layer of conductive ink deposited inside the tube.

2. A tubular SOFC structure according to claim 1, wherein the first gas is fuel gas and the second gas is air, the tube terminates in an open end located within the enclosure, and an exhaust conduit is provided for conveying combustion products from the enclosure.

3. A tubular SOFC structure according to claims 1 or 2, wherein the self-supporting tube is stabilized zirconia.

4. A tubular SOFC structure according to claim 3, wherein the stabilizer is yttria.

5. A tubular SOFC structure according to claim 1, wherein the outer electrode comprises a porous layer of doped lanthanum manganite.

6. A tubular SOFC structure according to claim 5, wherein the outer electrode comprises a spiral wire in contact with the lanthanum manganite.

7. A tubular SOFC structure according to claim 1, wherein the inner electrode is extruded as part of the self-supporting tube.

8. A tubular SOFC structure according to claim 7, wherein the inner electrode is a mixture of nickel and zirconia oxide.

9. A tubular SOFC structure according to claim 1, wherein the self supporting tube includes an electrolyte and a longitudinally extending strip of electrically conductive material that extends radially through the tube wall and makes contact with the inner electrode.

10. A tubular SOFC structure according to claim 1, wherein the extruded tube has an outside diameter of from 1 to 5 mm.

11. A tubular SOFC structure according to claim 1, comprising a preheater heated by combustion products in the gas supply conduit through which the gas containing oxygen is supplied.

12. A tubular SOFC structure according to claim 1, comprising a water heat exchanger to extract heat from combustion products.

13. A tubular SOFC structure comprising a self-supporting extruded tube a longitudinally extending portion of which includes an electrolyte, an electrically conductive inner electrode making electrical contact with the inner wall of the electrolyte, an electrically conductive outer electrode making electrical contact with the outer wall of the electrolyte, a thermally insulating enclosure defining a wall through which the tube extends such that a first portion of the tube extends within the enclosure and a second portion of the tube extends outside the enclosure, a first gas supply conduit connected to the end of the second portion of the tube by a gas-tight seal located outside the enclosure, a second gas supply conduit which opens within the enclosure, one of the first and second gases being a fuel gas and the other containing oxygen, and means for heating the interior of the enclosure to a temperature at which the structure operates as a solid oxide fuel cell, and further comprising means for mixing air with the fuel gas before it is delivered to the tubular structure.

14. A tubular SOFC structure according to claim 13, wherein the first gas is fuel gas and the second gas is air, the tube terminates in an open end located within the enclosure, and an exhaust conduit is provided for conveying combustion products from the enclosure.

15. A tubular SOFC structure according to claim 13, wherein the self-supporting tube is stabilized zirconia.

16. A tubular SOFC structure according to claim 15, wherein the stabilizer is yttria.

17. A tubular SOFC structure according to claim 13, wherein the inner electrode extends the length of the extruded tube.

18. A tubular SOFC structure according to claim 17, wherein the inner electrode is a spiral wire in contact with a porous layer of conductive ink deposited inside the tube.

19. A tubular SOFC structure according to claim 13, wherein the outer electrode comprises a porous layer of doped lanthanum manganite.

20. A tubular SOFC structure according to claim 19, wherein the outer electrode comprises a spiral wire in contact with the lanthanum manganite.

21. A tubular SOFC structure according to claim 13, wherein the inner electrode is extruded as part of the self-supporting tube.

22. A tubular SOFC structure according to claim 21, wherein the inner electrode is a mixture of nickel and zirconia oxide.

23. A tubular SOFC structure according to claim 13, wherein the self supporting tube includes an electrolyte and a longitudinally extending strip of electrically conductive material that extends radially through the tube wall and makes contact with the inner electrode.

24. A tubular SOFC structure according to claim 13, wherein the extruded tube has an outside diameter of from 1 to 5 mm.

25. A tubular SOFC structure according to claim 13, comprising a preheater heated by combustion products in the gas supply conduit through which the gas containing oxygen is supplied.

26. A tubular SOFC structure according to claim 13, comprising a water heat exchanger to extract heat from combustion products.

\* \* \* \* \*

UNITED STATES PATENT AND TRADEMARK OFFICE
CERTIFICATE OF CORRECTION

PATENT NO : 5,827,620
DATED : October 27, 1998
INVENTOR(S) : Kendall, Kevin

It is certified that error appears in the above-identified patent and that said Letters Patent is hereby corrected as shown below:

In column 3, line 8, please change "provide" to --proved--.

In column 4, line 52, please change "not" to --now--.

In column 4, line 63, please delete "to".

In column 7, line 24, please change "KWh" to --kWh--.

In column 7, line 53, please change "it" to --It--.

In column 10, line 13, please change "connects" to --connections--.

Signed and Sealed this

Sixth Day of April, 1999

Attest:

Q. TODD DICKINSON

Attesting Officer

Acting Commissioner of Patents and Trademarks